US006843297B2

(12) United States Patent
McKay et al.

(10) Patent No.: US 6,843,297 B2

(45) Date of Patent: Jan. 18, 2005

(54) LAMINATE CARTRIDGE

(75) Inventors: Kerry Neal McKay, San Diego, CA (US); Robert John Rosati, Carlsbad, CA (US); Scott Matthew Dennis, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 211 days.

(21) Appl. No.: 10/038,743

(22) Filed: Dec. 31, 2001

(65) Prior Publication Data

US 2003/0121612 A1 Jul. 3, 2003

(51) Int. Cl.[7] .................................................. B32B 31/00

(52) U.S. Cl. ....................... 156/540; 156/555; 156/556; 156/582; 156/584

(58) Field of Search ................................. 156/540, 541, 156/542, 543, 555, 344, 584, 574, 556, 582; 400/693; 347/222

(56) References Cited

U.S. PATENT DOCUMENTS 5,652,647 A * 7/1997 Yashiro et al. .............. 399/111
5,897,256 A * 4/1999 Kameyama ................. 400/208

* cited by examiner

*Primary Examiner*—Sue A. Purvis

(57) ABSTRACT

An overcoat application apparatus is used to transfer an overcoat material from a donor support to a printed media. The overcoat application apparatus in this case includes a laminate cartridge, a donor supply reel, a donor guide bar, a heated fuser roller, a pressure roller, a peel bar, and a take-up reel. The donor supply reel provides a continuous source of donor plus overcoat material. The donor guide bar guides printed media and the donor plus overcoat into a nip created by forcing the heated fuser roller and pressure roller together. The heated fuser roller is used to transport the printed media and donor through the nip and apply heat to the donor and printed media. The pressure roller is used to apply pressure to the fuser roller in order to produce the mechanical nip. The nip plus the heat causes the overcoat material on the donor to be transferred to the printed media. After the fusing process, the peel bar is used to separate the support layer of the laminate carrying donor from the printed media that is now coated with the overcoat material. The laminate cartridge has two spool holders, the first spool holder supports a spool of the laminate carrying donor material and the second spool holder supports a spool of the substrate after the overcoat material is used.

8 Claims, 4 Drawing Sheets

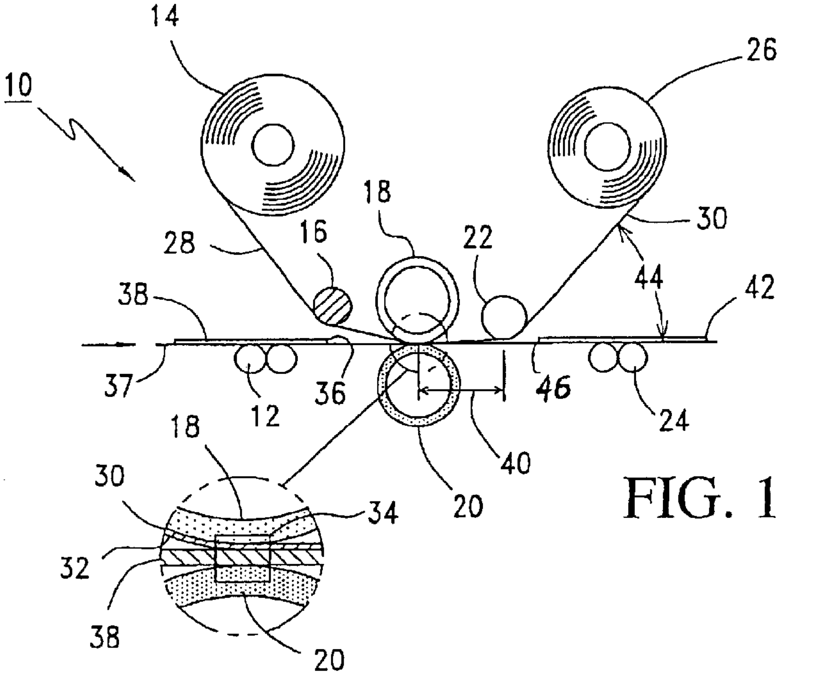
FIG. 1
FIG. 2
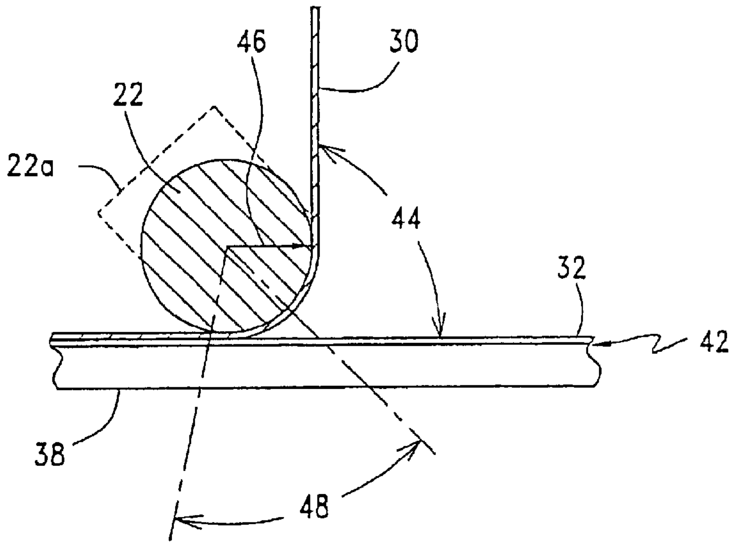

LAMINATE CARTRIDGE

CROSS REFERENCE TO RELATED CASES

This application is related to Ser. No. 10/038,792, filed Dec. 31, 2001, and titled "Overcoat Application Peel Apparatus".

FIELD OF THE INVENTION

The present invention relates in general to an apparatus that utilizes a lamination process to transfer an overcoat from donor support to printed media. More particularly, this invention relates to a removable laminate cartridge for use in the lamination apparatus done such that the donor support can be separated or peeled from the printed media leaving an overcoat behind on the printed media.

BACKGROUND OF THE INVENTION

Durability of photographic and near photographic images has become a feature that is growing in demand in recent years. Current commercial means of improving durability include lamination with a clear adhesive liquid laminate material or coating (via spray or liquid application) that dries to a clear protective layer. Another lamination process known as "peel apart" lamination has been demonstrated for diffusion transfer images.

The focus of this particular invention is the laminate cartridge used in the peel-apart or thermal transfer lamination process. This technique transfers an overcoat material from a laminate carrying substrate donor support to a printed image. This transfer is often done through a process in which the donor support with the overcoat and the printed media are brought together mechanically with pressure and then heat is applied for a specific exposure time period. This process causes the overcoat material to transfer from the donor to the printed image, the donor can then be peeled away.

One example of this technique uses a heated fuser and a platen to sandwich or press the donor support with overcoat and the printed media together in a mechanical nip. The donor support with overcoat and the printed media are then transported at a constant rate of speed between the heated fuser and the platen such that the exposure time and temperature are controlled. While in the nip, the thermal energy from the heated fuser causes the transfer to take place. The composite laminate carrying substrate donor support, overcoat, and printed media are then transported and manipulated to separate the donor support to be separated from the printed media and its new overcoat layer.

The donor support and the overcoated printed media can not be easily separated directly upon exiting the nip of the heated fuser and platen. This is usually due to the fact that the overcoat material is in a phase state that does not allow it to have an adhesion affinity for the printed media that is greater than its affinity for the donor support. Therefore, a curing time must be allowed and a separation or peeling process must occur downstream of the nip. This separation or peeling mechanism is usually designed to maximize the following functional requirements:

a) The overcoat remains uniformly applied to the printed media.
b) No contamination is generated in the form of bits of unused or non-adhered overcoat.
c) No donor support or media transport jams are generated.
d) The process works over a wide range of printed media sizes and types, donor support and overcoat material types, and equipment settings.

Mechanisms designed to meet these requirements can be found in a multitude of patents and in practice. For example, in U.S. Pat. No. 5,658,416, MacCollum et al. describes in a method and apparatus that uses a number of means for performing a peel of a laminate from another substrate. The basic mechanism is one in which the separation of substrates is done using a vacuum in conjunction with a peel angle. In addition, a beater blade is used near the separation point to aid the separation by introducing pulsating forces to the substrates. In U.S. Pat. No. 5,643,392, Clough describes in a method in which tension control and a peel angle are used to separate substrates. Schulte, Goodwin et al., and Mistyrik in U.S. Pat. Nos. 5,820,277, 5,788,384, and 6,053,648 discuss other tension control means, respectively. Mistryrik describes a bowed plate for improved transport performance of the substrates. Miyashita in U.S. Pat. No. 4,420,152 in which pawls are used to separate the substrates describes another means. Finally, Pickering et al. describes in U.S. Pat. No. 5,499,880 a donor guide that has a similar function to the peel bar already described.

An example of the process in practice can be found in the Kodak Picture Maker. The Kodak Picture Maker is a commercial printer that uses a thermal dye diffusion to transfer both dye and a protective overcoat to printed media. Specifically, this printing process is one in which dye is transferred from a donor ribbon to media by means of heating a thermal printhead (instead of a fuser) while the printhead, donor ribbon and media are in mechanical contact. By performing this process in a serial fashion for three separate primary color patches (sometimes there is a fourth black patch) in a controlled manner, an image can be produced on the media. To ensure durability, this printing process is performed one more time except that instead of dye transfer, a continuous clear overcoat material is transferred to the media. The mechanism used to separate the donor support from the overcoated printed media is a peel bar. It is located downstream of the nip and is simply a mechanical feature that is used to define the geometric line along which the donor support is directed to a take-up roll and the overcoated printed media is directed toward the exit of the printer. The distance between the nip and the peel bar is critical in that it provides the curing time required to perform a clean peeling action.

In the above cases, the laminate carrying substrate donor device is used to supply the laminate carrying substrate to the overcoat application apparatus. These devices can be expensive, and difficult to put and keep in position. In addition the prior art devices are not ergometrically efficient causing lost hours and additional costs due to injury or downtime. Finally many of these devices cause machine failures leading to expensive machine downtime and repairs.

Therefore there is a need for an improved laminate-carrying device that is low cost and effective for a wide range of printing processes and peel-apart materials. The intention of the invention is to describe a mechanism that meets these needs.

SUMMARY OF THE INVENTION

An object of the present invention is to provide an overcoat application process in which an overcoat material is transferred from a donor support to a printed image.

Another object of the invention is to provide a means in which the donor support and the printed image with an overcoat are separated or peeled apart in a controlled fashion such that the overcoat material remains uniformly applied to the printed image.

Yet another object of the invention is to provide a means in which the donor support and the printed image with an overcoat are separated or peeled apart in a controlled fashion such that no contamination is generated by the peeling action.

A further object of the invention is to provide a means in which the donor support and the printed image with an overcoat are separated or peeled apart in a controlled fashion such that the donor support and the printed image with an overcoat do not cause a transport jam.

A still further object of the invention is to provide a means in which the donor support and the printed image with an overcoat are separated or peeled apart in a controlled fashion such that the overall process has the ability to handle a wide variety of donor support, overcoat, and image material types and sizes within a specific equipment design.

A still further object of the invention is to provide a means in which the donor support is supported in place in a manner that is inexpensive, reliable and supports a means of placing and removing the support device that is ergometrically and manufacturing efficient resulting in a minimum of injury, machine failures, downtime and or repairs that is adaptable to a wide variety of donor support, overcoat, and image material types and sizes within a specific equipment design.

In accordance with one aspect of the present invention, there is provided an apparatus for printing an image or a plurality of images on media either in a roll supply form or a cut sheet form.

In accordance with a further aspect of the present invention, there is provided an apparatus for performing the overcoat application process. The apparatus including a laminate cartridge with a first and second spool for dispensing a laminate wherein at least one of the spools has a plurality of ratchet teeth that can be placed in a slot having a ratchet pawl at one end. That spool being movable within the slot from a first position in which the pawl engages the teeth to a second position in which the pawl is disengaged from the teeth so that the spool turns freely The novel aspects of the invention are set forth with particularity in the appended claims. The above and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which:

FIG. 1 is mechanical schematic diagram of an overcoat application mechanism in accordance with the invention;

FIG. 2 is a detailed isometric view of the peel bar;

DETAILED DESCRIPTION OF THE INVENTION

Figure 3:
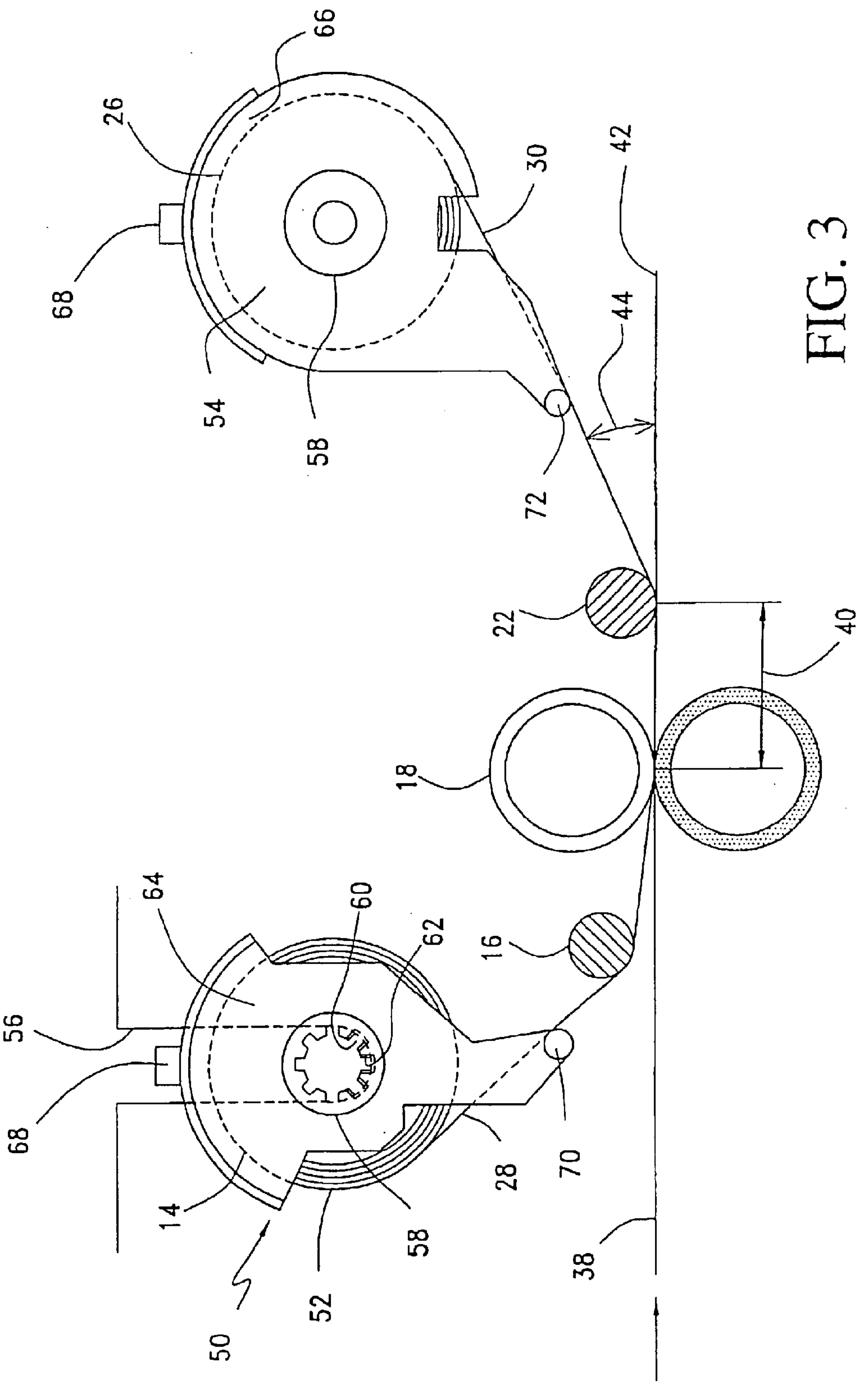
FIG. 3 is an isometric view of an overcoat application apparatus including a laminate cartridge.

The present description will be directed in particular to elements forming part of, or in cooperation more directly with, the apparatus in accordance with the present invention. It is understood that elements not specifically shown or described may take various forms well known to those skilled in the art.

Referring now to the drawings, like reference numerals represent similar or corresponding parts throughout the several views. FIG. 1 is a mechanical schematic diagram of the overcoat application apparatus 10. The overcoat application apparatus 10 consists of an entry roller 12, a donor supply reel 14, a donor guide bar 16, a heated fuser roller 18, a pressure roller 20, a peel bar 22, an exit platen 24 and a donor support take-up reel 26.

The basic function of the overcoat application apparatus 10 is described as follows. Again using FIG. 1 as reference, a laminate carrying donor, also known as the laminate carrying donor, 28 is threaded between the donor supply reel 14 and the donor support take-up reel 26. The laminate carrying donor is preferably a multi layer web that in its simplest form consists of a donor 30, hereafter referred to as a donor 30, and an overcoat material 32, hereafter referred to as a laminate 32. The threading is such that the laminate carrying donor 28 follows a path around the donor guide bar 16, through a nip 34 created by the heated fuser roller 18 and the pressure roller 20, and around the peel bar 22. In a normal idle mode, the fuser roller 18 is disengaged from the pressure roller 20 so that no transport of laminate carrying donor 28 is performed.

When the overcoat application process is ready to be performed, the pressure roller 20 is pressed against the heated fuser roller 18. Simultaneously, the heated fuser roller 18 is rotated, preferably at a constant speed thus transporting the laminate carrying donor 28 through the nip 34. Tension control on both the donor supply reel 14 and take-up reel 26 allow this laminate carrying donor 28 transport to be done in a controlled fashion. In addition to all of these events, a sheet or a continuous reel of printed media 38 is fed onto the entry roller 12 such that the leading edge of the printed media 38 enters the nip 34 along with the laminate carrying donor 28. The trailing edge 37 of the printed media 38 follows.

At this point, thermal energy from the heated fuser roller 18 is transferred into the portion of the laminate carrying donor 28 and printed media 38 that are in the nip 34. The length of thermal energy exposure time and the amount of thermal energy transferred to the laminate carrying donor 28 and the printed media 38 are a function of the transport speed created by the rotation of the heated fuser roller 20 and the width of the nip 34 and the temperature and thermal characteristics of the fuser roller 20, the laminate carrying donor 28, the printed media 38, and the pressure roller 20. During this exposure time, the laminate carrying donor 28, overcoat material 32, and printed media 38 are fused together. The fused composite continues on its way until it encounters the peel bar 22. The distance between the nip 34 and the apex of the peel bar 22 is referred to as the cooling distance 40.

At the peel bar 22 a number of functions are occurring. Using FIG. 2 for reference, the donor 30 is directed to the take-up reel 26, while the laminated article 42, also known as a laminated printed media 42, is directed to the exit roller 24. The angle between these redirections is referred to as the peel angle 44. It should be noted that the article to be laminated might include other items such as clothing, as is well known in the art. The goal of this redirection is to accomplish the following functional requirements.

a) The overcoat material 32 is completely transferred from the donor 30 to the printed media 38 such that a completely uniform coating is produced.
b) No contamination is generated.
c) No laminate-carrying donor 28 or printed media 38 transport jams are generated from the excess lamination material, generally called flash, at the trailing edge 46 of the laminated printed article.
d) The process works over a wide range of printed media 38 sizes and types, donor 30 and laminate 32 sizes and types, and various settings and configurations of the overcoat application apparatus 10.

Up to this point, this process that has been described is similar to the normal practice. The Kodak Picture Maker example discussed in the background section is an example of this practice other than the fact that a thermal printhead is used to perform the fusing process instead of a heated fuser roller 18. What distinguishes this design from the normal practice is the detail design of the laminate cartridge.

FIG. 2 shows a front view of the peel bar 22 and illustrates that the peel bar curvature 48 could have an alternate shape for the peel bar 22*a*. The peel bar has a radius 46 and a peel bar wrap angle 48. These are geometric features of the peel bar associated with the peeling process.

FIG. 3 shows the laminate cartridge 50 of the present invention for an overcoat application apparatus 10. The laminate cartridge 50 of FIG. 3 has first spool 52 with a supply of laminate carrying donor 28 and a second spool 54 where the donor 30 is wound after peeling from the overcoat material 32. The first spool 52 of the laminate cartridge 50 may sit in a slot 56 of a cartridge holder of the overcoat application apparatus 10 only a portion of the holder containing the slot 56 being shown. The spools 52, 54 each have a core 58 wherein one or both of the cores 58 have a plurality of ratchet teeth 60 constructed to fit into tooth repository 62. The spool 52, 54 is movable within the slot 56 from a first position in which the ratchet teeth 60 engage and a second position in which the ratchet teeth 60, disengage from the repository 62. When the teeth 60 and the repository 62 are engaged, a ratchet system 78 (FIG. 8) is formed. When the teeth and repository are disengaged, the spool 52. 54 will turn freely.

Figure 4:
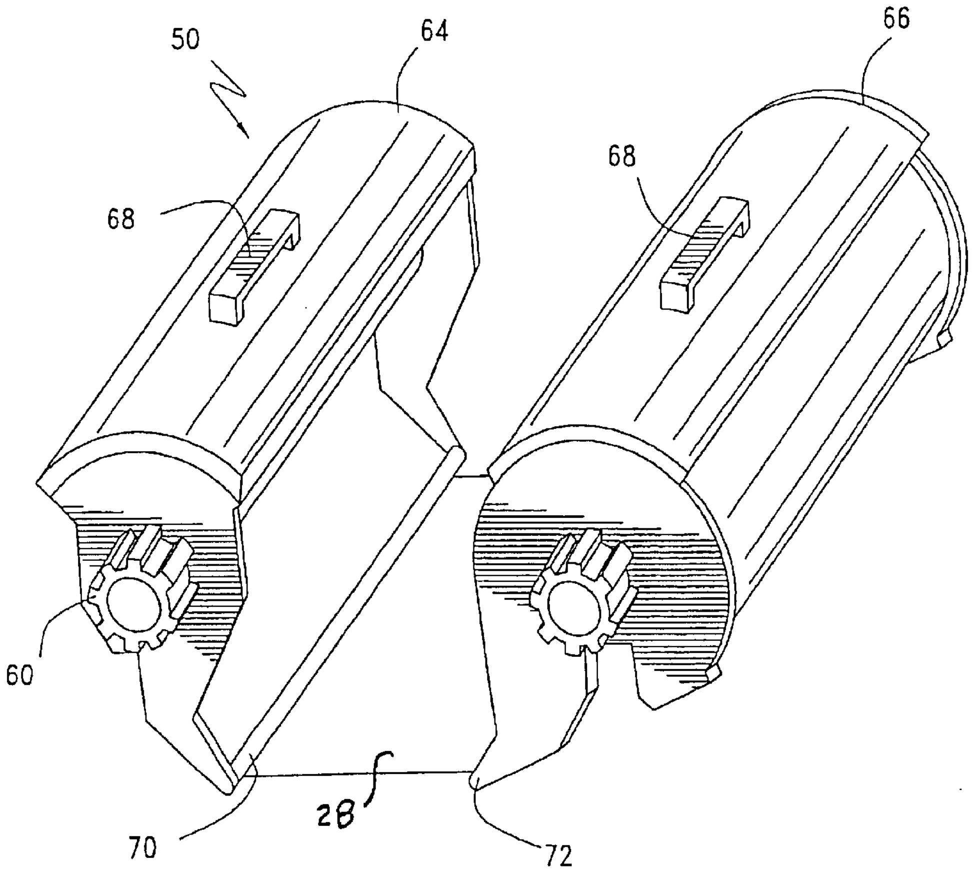
FIG. 4 is a perspective view of the laminate cartridge.

FIG. 4 shows the laminate cartridge 50 without the spools 52, 54. The laminate cartridge 50 has a first housing 64 and a second housing 66. The laminate cartridge 50 also has one or more handles 68 attached to the one or more of the first housing 64 and second housing 66. FIG. 4 shows these handles 68 attached to both the first spool housing 64 and the second spool housing 66. The first and second housings 64,66 can be constructed of a durable but light plastic.

There are many designs used to accommodate the first and second housings 64, 66, as well as the handles 68. An ergometrically efficient cartridge design is necessary as will be discussed in more detail below. The laminate cartridge 50 has one or more guide bars. FIG. 4 shows a first guide bar 70 and a second guide bar 72 for holding tension on the laminate substrate 28.

Figure 7:
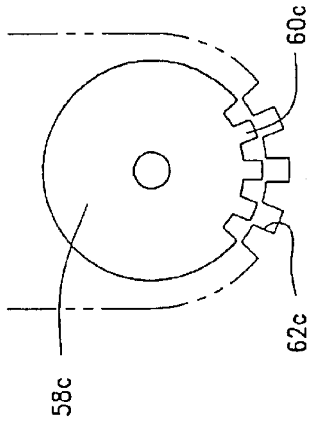
FIG. 7 is another embodiment of the laminate cartridge showing a portion of the laminate cartridge including the core.
Figure 6:
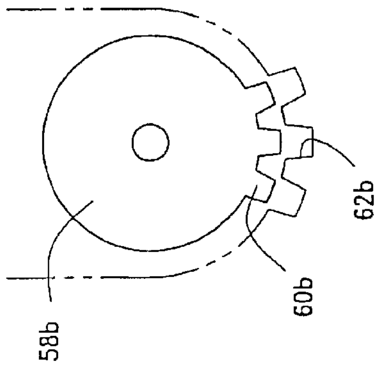
FIG. 6 is another embodiment of the laminate cartridge showing a portion of the laminate cartridge including the core.
Figure 5:
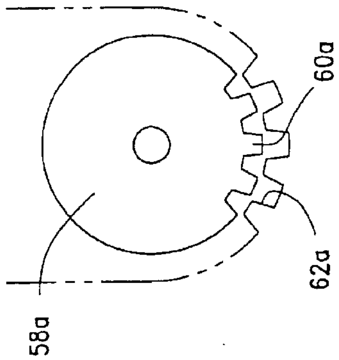
FIG. 5 is a portion of the laminate cartridge including the core.

FIGS. 5, 6, and 7 show three embodiments of the ratchet teeth 60 and associated repository 62 in which the ratchet teeth 60 and associated repository 62 are designed in different manners. FIG. 5 shows the ratchet teeth configured such that the teeth 60*a* do not protrude from the circumference of the core 58*a* when seated in the associated repository 62*a*. This is advantageous when space and clearances are a concern because this design is very space efficient. FIG. 6 shows ratchet teeth 60*b* configured such that the teeth 60*b* do extend beyond the core 58*b* circumference when seated in the associated repository 62*b*. Finally FIG. 7 shows a ratchet teeth 60*c* that may or may not extend beyond the circumference of the core 58*c* when seated in the associated repository 62*c* but have a square shape. It is apparent to those skilled in the art that various shaped teeth 60 could be used in this invention and these shapes are shown to illustrate particular possibilities but not to limit the possible tooth shape associated with the invention.

Figure 8:
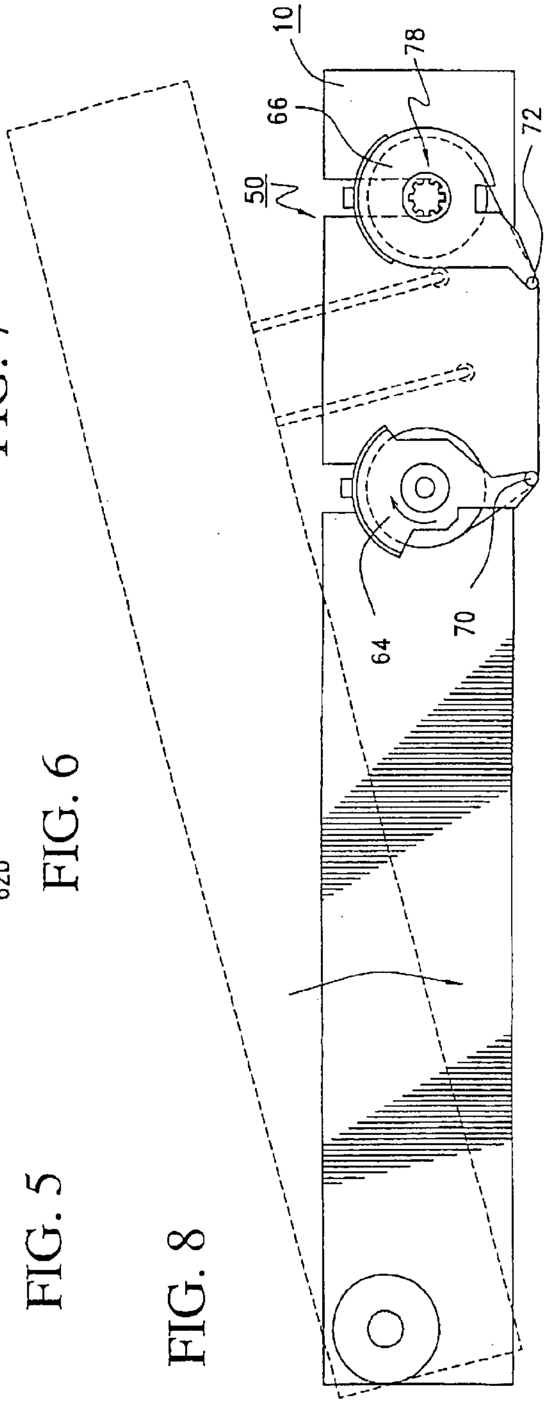
FIG. 8 is a side view of the overcoat application apparatus including the laminate cartridge.

The laminate cartridge 50 in FIG. 8 has been ergometrically designed so that the spacing of the handles 68 is such to make easy movement from the source of the cartridge to its placement in the holder 10. of the overcoat application apparatus. Preferably, the laminate cartridge has a flexible frame with an ergonomically beneficial design which allows at least the two spool housings 64, 66 to accommodate a spacing between the handles 68 that accommodates a variety of body sizes thus allowing good ergonomic form while loading the laminate reel and getting it ready for application to a media while keeping the cost low. Low cost is an issue since the cartridge is a consumable item and may be thrown away after the laminate is used up. These laminate reels are large (4 inches in diameter and 13½ inches long for example and heavy, possibly 8.8 pounds each).

The laminate cartridge 50 comprising the two spool housings 64, 66 is taken out of the packaging by the handles 68 and set into the overcoat application apparatus holder 10 by inserting the cores 58 into the slots 56. The guide bars 70 on one or both of the spool housings 64, 66 tension the laminate-carrying donor 28 as discussed above. A ratchet system 78 includes the slot 56 with a tooth 60 and repository 62 combination as discussed above and as shown in FIG. 3. The system 78 keeps the spent laminate from unwinding from the take-up spool.

In order to keep the cost low, the cartridge has been designed with independent handles on each reel or spool with a minimum of plastic and parts. This is a low cost system that has excellent ergonomics, for cartridge positioning during loading. The web remains taut on insertion into the mechanism as discussed above.

The invention has been described in detail with particular reference to certain preferred embodiments thereof, but it will be understood that variations and modifications can be effected within the spirit and scope of the invention.

What is claimed is:

1. An overcoat application apparatus for applying a laminate overcoat to a print media, the apparatus including a cartridge holder having a laminator cartridge-receiving slot and comprising:

a) a laminate cartridge comprising a housing including a donor core having one or more teeth engaging the cartridge-receiving slot of the cartridge holder such that when the core is raised in the slot, the core is disengaged from the cartridge holder;
b) a spool of laminate carrying donor, comprising a donor layer and an overcoat layer, wound on the donor core;
c) an entry roller for accepting printed media from a printer;
d) a guide bar that guides the laminate carrying donor into a nip formed by a heated fuser roller and a pressure roller;
e) one of the heated fuser roller and the pressure roller being rotated to transport the printed media and the laminate carrying donor through the nip and the heated fuser roller applying heat to the laminate carrying donor and the printed media to laminate the overcoat layer to the print media to provide an overcoated print media;

f) a peel bar positioned to separate the donor layer of the laminate carrying donor from the overcoat layer laminated to the printed media;

g) an exit roller which accepts the overcoated printed media and transports it from the overcoat application apparatus; and h) a take-up spool that collects the donor layer.

2. The laminate cartridge of claim 1 wherein the one or more teeth on the donor core engageable with the cartridge-receiving slot of the cartridge holder do not protrude beyond the perimeter of the donor core.

3. The overcoat application apparatus of claim 1 further comprising a guide bar supported by the housing such that the guide bar is capable of guiding the laminate carrying donor as it moves from the housing.

4. The laminate cartridge of claim 3 further comprising a handle attached to the housing.

5. The overcoat application apparatus of claim 1 comprising a second housing supporting a second core and the donor layer is wound on the second core forming the take-up spool.

6. The overcoat application apparatus according to claim 5 further comprising a second guide bar supported by the second housing such that the second guide bar is capable of guiding the donor layer toward the second housing.

7. The overcoat application apparatus of claim 6 further comprising a second handle attached to the second housing.

8. The overcoat application apparatus of claim 5 further comprising a one or more teeth on the second core that cooperate with a tooth repository associated with a second laminator cartridge-receiving slot in the cartridge holder such that the tooth repository engages the teeth on the second core when the second core is inserted into the second laminator cartridge-receiving slot.

* * * * *